Figure 1:
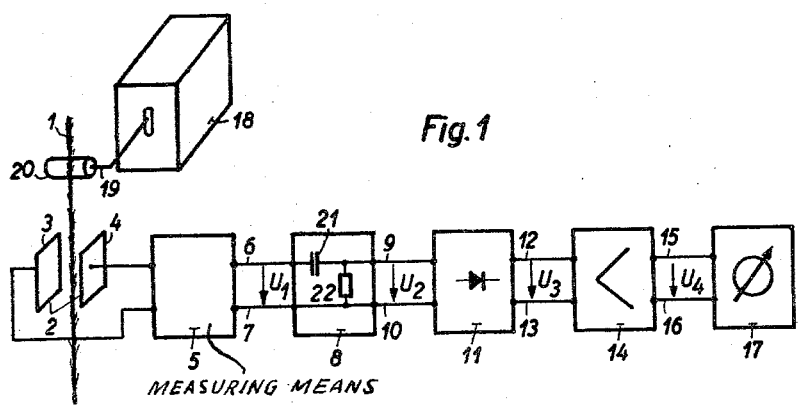

May 25, 1965     H. LOCHER     3,185,924
APPARATUS UTILIZING CAPACITANCE MEASURING MEANS FOR THE
CONTINUOUS MONITORING OF ELONGATE MATERIALS DURING
PRODUCTION TO PERMIT DETERMINATION OF THE
DEVIATION OF THE DENIER FROM
A DESIRED VALUE

Filed July 14, 1959     5 Sheets-Sheet 1

INVENTOR
HANS LOCHER
BY
ATTORNEYS

May 25, 1965

H. LOCHER 3,185,924

APPARATUS UTILIZING CAPACITANCE MEASURING MEANS FOR THE
CONTINUOUS MONITORING OF ELONGATE MATERIALS DURING
PRODUCTION TO PERMIT DETERMINATION OF THE
DEVIATION OF THE DENIER FROM
A DESIRED VALUE

Filed July 14, 1959

5 Sheets-Sheet 3

INVENTOR.
HANS LOCHER

BY Herman Seid
Robert W. Fiddler
ATTORNEYS

May 25, 1965 H. LOCHER 3,185,924
APPARATUS UTILIZING CAPACITANCE MEASURING MEANS FOR THE
CONTINUOUS MONITORING OF ELONGATE MATERIALS DURING
PRODUCTION TO PERMIT DETERMINATION OF THE
DEVIATION OF THE DENIER FROM
A DESIRED VALUE
Filed July 14, 1959 5 Sheets-Sheet 4

INVENTOR.
HANS LOCHER
BY Herman Seid
Robert W. Siddler
ATTORNEYS

United States Patent Office 3,185,924
Patented May 25, 1965

3,185,924
APPARATUS UTILIZING CAPACITANCE MEASURING MEANS FOR THE CONTINUOUS MONITORING OF ELONGATE MATERIALS DURING PRODUCTION TO PERMIT DETERMINATION OF THE DEVIATION OF THE DENIER FROM A DESIRED VALUE
Hans Locher, Uster, Switzerland, assignor to Zellweger Ltd., Uster, Switzerland, a corporation of Switzerland
Filed July 14, 1959, Ser. No. 827,053
15 Claims. (Cl. 324—61)

This invention relates to quality control means, more particularly to means for measuring an elongate material during production, and providing an observable signal indicative of the variation of a quality of the material from a desired value.

Various electrical, optical and pneumatic means have been evolved for the direct determination of the qualities of a material, and the deviation of these qualities from a desired value. Thus electrical means are known which make use of a measuring device including a high frequency condenser arranged in a suitable circuit to produce an electrical signal which is representative of the denier of a textile material. This signal is then amplified and fed to an indicating instrument.

In use, the circuit with empty measuring condenser is first calibrated by adjusting the circuit to a specific indicating signal, for instance to the so-called zero signal, which corresponds to a zero denier value. After insertion of the textile sample into the measuring condenser a different indicating signal is obtained, and the difference between this new value and the value obtained with the empty measuring device represents the denier of the textile sample. When denier measurements are made directly at the textile processing machine, over the relatively long period of operation of these processing machines, a disturbed indication or measuring fault often results. Such measuring faults may be caused either by undesired variations of the capacitance of the measuring condenser itself, or because of instability of the circuit. In practice it is found that variations occur in the capacitance of the empty measuring condenser and the parameters of the relatively high frequency circuit elements, due to temperature changes and other influences.

In such cases it is necessary to temporarily remove the textile sample from the measuring condenser in order to check whether the initially set zero signal is obtained, or whether a change has occurred since the last zero adjustment.

Some of these difficulties can be minimized in a variety of ways. Thus a very stable measuring condenser, or geometrical and electrical balancing condensers, may be utilized to minimize external influences. Due to the extremely small capacitance effects produced by fine textile material in an electrical measuring condenser, even the best arrangement does not fulfill requirements with regard to stability. This necessitates relatively frequent checking of the measuring system with regard to variations of the zero adjustment of the measuring means, requiring additional maintenance work and down time.

It is with the above problems in mind that the present means have been evolved, means permitting continuous supervision of elongate materials during production. The novel supervising means permits measurement of the material to indicate both long term variations along with short term variations, with said means being automatically self-compensating for variations in the structural components of any equipment employed.

It is accordingly a primary object of this invention to provide material measuring means indicating both long and short term variations in the material.

Another object of the invention is to provide means for effecting denier measurements of a textile material in which variations in the parameters of any equipment employed for effecting said measurements do not effect the measurements.

A further object of the invention is to provide means for continuously supervising yarn denier during yarn production and determining deviations of the yarn denier from a desired standard value.

It is also an object of the invention to provide means for measuring deviation of yarn denier from a standard value in which no need exists for periodic recalibration.

These, and other objects of the invention which will become hereinafter apparent are attained by providing novel means for the continuous supervision of an elongate material in which the deviation of a desired quality of the material from a nominal value is determined. The novel means include measuring means which produce an electrical signal representative of the measured quality of the material. Vibrating means are employed to effect periodic relative movement between the material and the sensing element of the measuring means with the result that the signal provided by the measuring means varies in accordance with the position of the material with respect to the sensing element of the measuring means. The resulting electrical signal is fed to the input terminals of frequency dependent electrical filtering means, which deliver only those filtered A.C. components of the electrical signal which are equal to or higher than the frequency of the periodic relative movement between the material and the measuring means and which are therefore free from long term disturbances on the measuring means. These filtered A.C. components are rectified so that the magnitude of the resulting D.C. signal corresponds to the algebraic sum of the peak voltage of the negative and positive half-wave of the filtered A.C. component, whereupon this D.C. signal, which is representative of the denier of the textile material, may if necessary, be further amplified and then the amplified signal transduced to provide an observable and evaluable signal.

Figure 2:
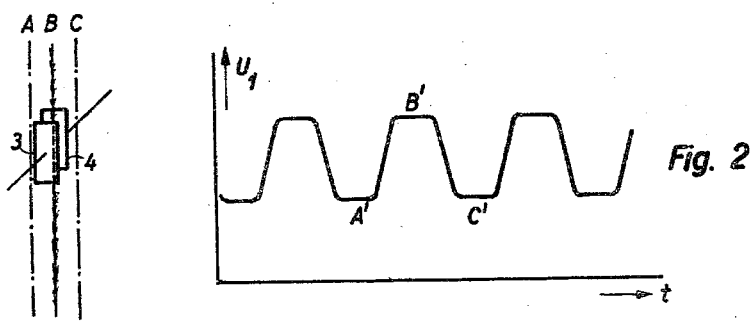
Figure 3:
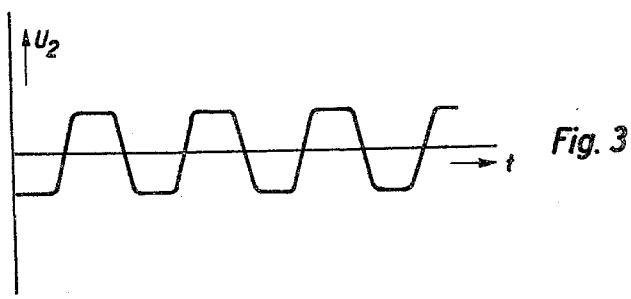
Figure 4A:
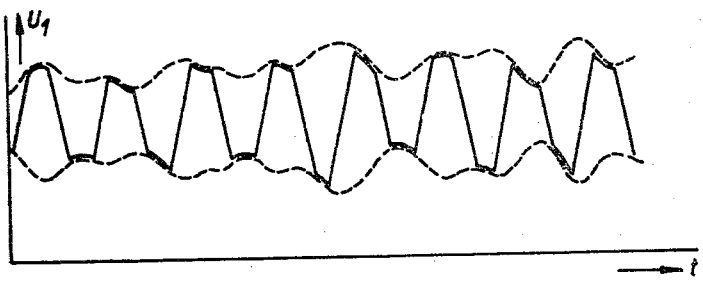
Figure 4B:
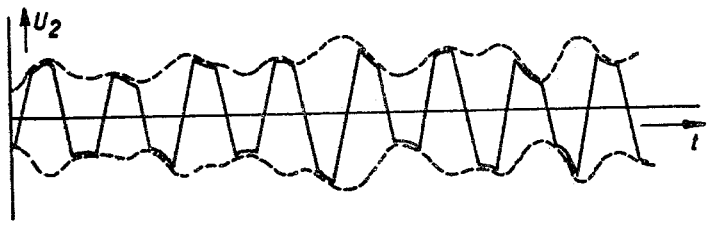
Figure 5A:
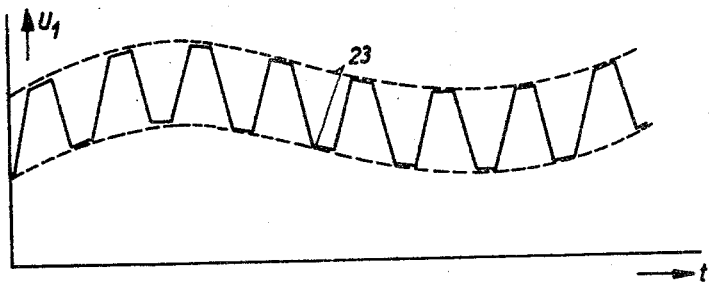
Figure 5B:
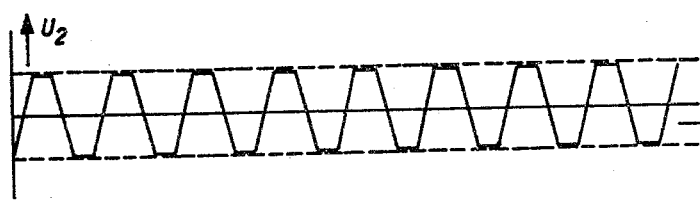
Figure 6:
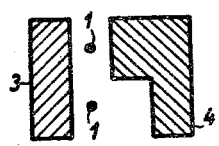
Figure 7A:
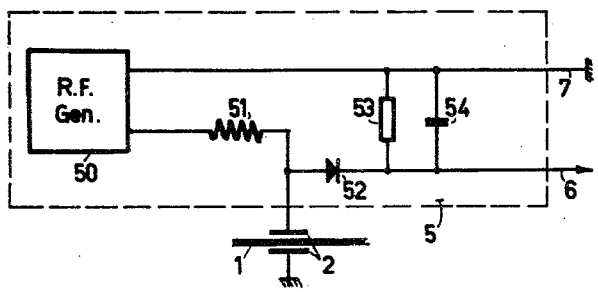
Figure 7B:
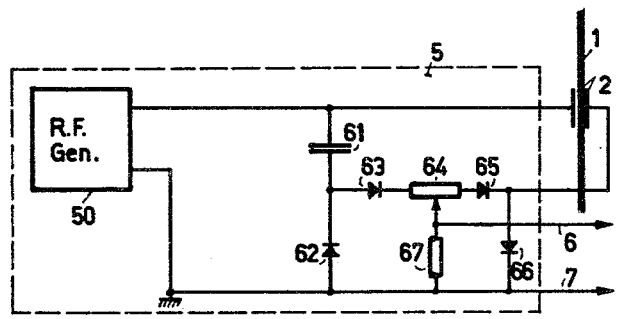
Figure 7C:
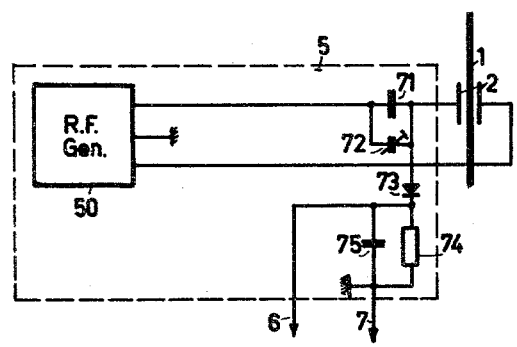
Figure 8A:
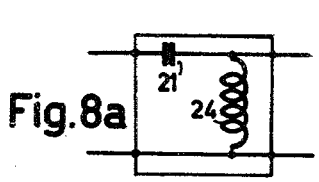
Figure 8B:
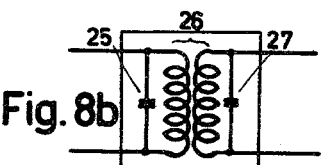
Figure 9A:
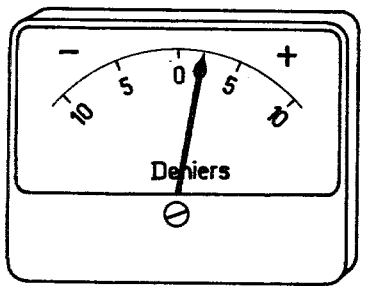
Figure 9B:
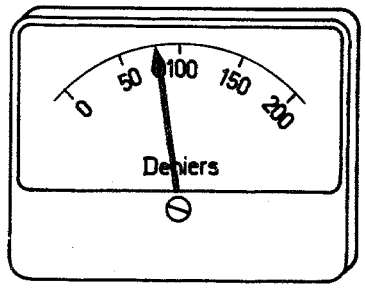
Figure 9C:
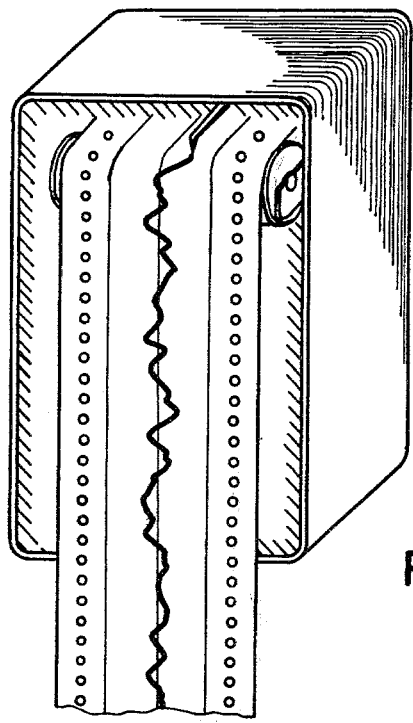
Figure 10:
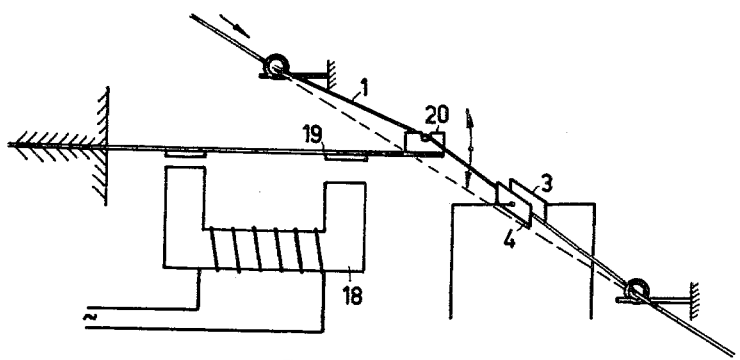
Figure 10:
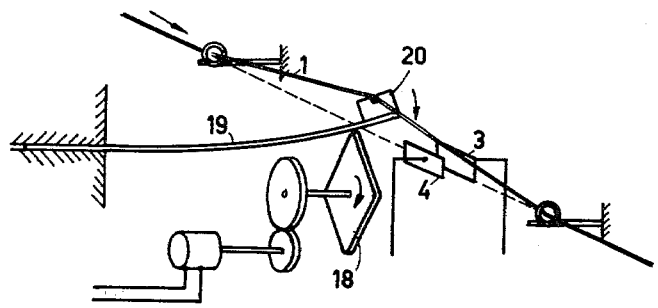

The specific structural details of some apparatus employed in practicing the invention, and a method of practicing the invention will be particularly pointed out in clear, concise and exact terms in conjunction with the accompanying drawings wherein:

FIG. 1 is a block diagram showing schematically the components employed in practicing the invention; and FIG. 2 is a trace of the signal delivered by the novel measuring means; and FIG. 3 is a trace of the signal shown in FIG. 2, after it has passed the frequency dependent electrical filtering means; and FIG. 4a represents the signal delivered by the measuring means under conditions of quality variations in the material; and FIG. 4b represents the filtered A.C. components for the signal of FIGURE 4a which appear on the output terminals of the frequency dependent electrical fitering means; and FIG. 5a represents the signal delivered by the measuring means under conditions of long term variations introduced by the measuring means; and FIG. 5b represents the filtered A.C. component for the signal of FIG. 5a which appears on the output terminals of the frequency dependent electrical filtering means; and FIG. 6 is a cross-sectional detail of a possible design of the electrodes of a sensing element of the measuring means; and FIGS. 7a–7c show some suggested resistance-capacitance networks suitable for use in the measuring means; and FIGS. 8a and 8b show some suggested circuits for the filtering means; and FIGS. 9a–9c show some suggested indicating instruments; and FIGS. 10a and 10b show some suggested embodiments of the vibrating means.

Referring now more particularly to the drawings like numerals will be employed to designate like parts.

As best seen in FIG. 1, an elongate material 1 such as a textile, yarn or the like is shown arranged adjacent sensing element 2 of measuring member 5. Sensing element 2 is here shown in the form of a plate condenser comprising spaced condenser plates 3 and 4 arranged to form a part of an electrical circuit constituting measuring device 5. The output signal $U_1$ of measuring device 5 is fed via lines 6 and 7 to frequency dependent filter 8, which will be hereinafter more fully described. Filter output lines 9 and 10 lead the filtered output signal $U_2$ to a full wave rectifier 11, and rectifier output lines 12 and 13 feed the rectified signal $U_3$ to an amplifier 14, whence the amplified signal $U_4$ is fed via amplifier output lines 15 and 16 to transducer 17 which will be hereinafter more fully described.

As seen in FIGS. 1, 10a and 10b vibrating means 18 are provided to effect a periodic movement of the supervised material 1 with respect to the sensing means of measuring device or member 5. These vibrating means 18 may be either of the electrical form illustrated in FIG. 10a, or the mechanical form illustrated in FIG. 10b. Armature 19 is brought into oscillation with frequency $f$ by the vibrating means 18, and material guide 20 arranged at the end of armature 19 serve to set the material into oscillation at the above noted frequency $f$.

Filter 8 may take a variety of forms as illustrated in FIGS. 1, 8a and 8b. Thus in FIG. 1, condenser 21 is arranged in series with line 6 while resistor 22 is arranged in parallel across lines 6 and 7. The parameter of resistors 21 and 22 is selected so that the filtered A.C. component $U_2$ of the electrical signal $U_1$ which is put out by the filter 8 will be equal to or higher than the frequency $f$ of the oscillation effected in textile material 1 by vibrator 18. In lieu of resistor 22, an inductance 24 may be employed as shown in FIG. 8a. Alternatively, the filter may be a band filter having a primary condenser 25, a transformer 26 and secondary condenser 27, as shown in FIG. 8b. The band filter of FIG. 8b may be expeditiously tuned to the frequency of vibrator 18.

The measuring member 5 may take any of the forms illustrated in FIGS. 7a, 7b and 7c. Thus in all three circuit arrangements, an R.F. generator 50 is shown as providing a signal which is effected by the capacitance of the condenser forming sensing means 2. In the FIG. 7a embodiment the R.F. generator 50 is arranged at the voltage divider with resistor 51 and the sensing condenser. A detector 52 is arranged in series with the condenser, and filtering means 53 and 54 are arranged in parallel across measuring member output lines 6 and 7. In the FIG. 7b embodiment, the circuit diagram employs a compensating condenser 61 coupled with the rectifier including diodes 62, 63, 65 and 66. Potentiometer 64 arranged between diodes 62, 63 and 65, 66 permits elimination of all variations not sensed by the sensing means 2. In the FIG. 7c arrangement, a bridge circuit is employed in which the measuring means 2 forms one of the bridge branches. Condenser 71 is arranged with trimmer condenser 72 as another branch, and diode 73 along with filters 74 and 75 connect up to output lines 6 and 7.

*Operation*

The aforedisclosed structural components may be utilized for measuring the quality of a wide variety of elongate materials. Particular utility is however found in connection with the supervision of the denier of textile materials during the fabrication thereof. This is done by training the material during its production processes through the sensing element 2 of measuring member 5.

The output signal $U_1$ of measuring member 5 is representative of the denier of the material. This output signal $U_1$ is formed as a result of the effects of the sensing element 2 on the signal provided by R.F. generator 50, due to any changes in capacitance in sensing element 2. An oscillation of frequency $f$ resulting from the effects of vibrating means 18 is always superposed on the signal provided by R.F. generator 50. The signal oscillations resulting from the vibrating means 18 are due to the change in position of the tested material 1 with respect to the sensing element 2.

Thus where denier measurements are to be made on a textile material, the relative position of the textile material with respect to the sensing element 2 of the measuring member 5 result in signal $U_1$ having a frequency $f$. This is quite apparent upon consideration of FIG. 2, which illustrates a measurement condition for constant denier material. The dot dash lines A and C represent the extreme positions of the tested material with respect to the sensing means, and the graph illustrates the trace of the signal $U_1$ delivered by the measuring member as the tested material is oscillated by the vibrating means. The measuring member provides a signal $U_1$ which oscillates between a maximum intensity when the material is at position of maximum sensitivity B, and a minimum intensity when the material is at the extreme positions of minimum sensitivity A and C. This signal $U_1$ with frequency $f$ resulting from the oscillations of the material between positions A and C is fed to filtering means 8 which may take any of the forms illustrated either in FIGS. 1, 8a or 8b, as will be apparent to those skilled in the art. In filtering means 8, the oscillatory signal $U_1$ is filtered to eliminate all frequencies lower than frequency $f$ to provide a filtered output signal $U_2$, the trace of which is seen in FIG. 3.

An examination of FIGS. 4a, 4b, 5a, and 5b will indicate how the invention may be practiced to permit continuous supervision of an elongate material providing an observable signal which is only indicative of a quality which is to be measured in said material. In FIG. 4a, a trace of an electrical signal $U_1$ is shown under conditions of denier variation. In FIG. 4b this signal $U_1$ is shown after passage through the filtering means 18 to produce output signal $U_2$ in which the D.C. component has been eliminated. It is thus apparent that the variations of the electrical signal $U_1$ which occur with a frequency not equal to frequency $f$ produced by the vibrating means are representative of the denier of the textile material.

In FIG. 5a the electrical signal $U_1$ is shown which would be produced with a constant denier textile material, but in which a long term variation on the measuring member occurs. This long term variation is illustrated in FIG. 5a by the envelope 23.

The filtered output signal $U_2$ is shown in FIG. 5b in which the long term variation attributable to instability of the measuring member is eliminated. The peak to peak value of the wave represents only the denier of the tested material.

The arrangement of the condenser plates illustrated in FIG. 6 has been found to provide a particularly satisfactory sensing element since as the material is moved from the more closely spaced parts of the condenser plates 3 and 4 to the more widely spaced parts, the measurements performed are not significantly affected by a change in amplitude of the vibration, due to the fact that the condenser field in both parts may be presumed to be nearly homogeneous.

It will of course be understood by those skilled in the art that a variety of filtering circuits, measuring circuits, and sensing elements may be employed as well as a variety of transducers, amplifiers, and rectifiers, without departing from the scope of this invention. Thus pneumatic or optical sensing elements may be employed, and the relative vibratory movement between the sensing element and the material may be obtained by vibrating either the material, the sensing element or both.

By use of the hereindisclosed novel features it is seen that means have been provided permitting continuous supervision of an elongate material to maintain some desired measurable quality of this material within a given range. Long term disturbances on the measuring equipment have no effect on the signal produced, and recalibration of the equipment is not necessary.

The above disclosure has been given by way of illustration and elucidation, and not by way of limitation, and it is desired to protect all embodiments of the hereindisclosed inventive concept within the scope of the appended claims.

What is claimed is:

1. Means for continuously supervising an elongate textile material during production to permit determination of the deviation of the measurement of the material from a desired value, said means comprising: measuring means providing an electrical signal representative of a quality of the textile material; vibrating means for effecting periodic relative movement between the material and said measuring means so as to produce a periodicity in the electrical signal provided by said measuring means; and frequency filtering means connected to receive as an input signal the signal from said measuring means, said filtering means passing an output signal containing only those frequencies of the input signal higher than the frequency of the relative movement between the material and said measuring means, whereby the output of said filtering means will be a signal representative only of quality variations of the material unaffected by the effects of long term disturbances on the measuring means.

2. Means as in claim 1 in which the output signal passed by said filtering means also include frequencies equal to that of the frequency of relative movement between the material and said measuring means.

3. Means as in claim 1 in which the output signal of said filtering means is fed to rectifying means.

4. Means as in claim 3 in which amplifying means are provided to receive the rectified signal from said rectifying means; and transducing means are coupled to said amplifying means to permit evaluation of the amplified signal.

5. Means as in claim 3 in which said rectifying means are full wave rectifying means.

6. Means as in claim 5 in which amplifying means are connected to said rectifying means to receive the rectified signal therefrom; and transducing means are coupled to said amplifying means to convert the amplifier signal into an observable signal.

7. Apparatus for continuously supervising the denier of a textile material during production to permit determination of the deviation of the denier from a desired value, said apparatus comprising: a measuring member having a sensing element arranged adjacent the path of travel of the textile material, said measuring member including a signal source providing a signal the magnitude of which is effected by the sensing element to be representative of the denier of the textile material; a vibrator causing periodic relative movement between the textile material and the sensing element of said measuring member to produce a periodicity in the signal; a filter to which the signal from said measuring member is fed, said filter passing an output signal containing only those frequencies higher than the frequency of the relative movement between the textile material and the sensing element of said measuring member, whereby the output signal of said filter will be representative only of denier variations unaffected by the effects of long term disturbances on the measuring member.

8. Apparatus as in claim 7 in which: said filter passes an output signal containing frequencies equal to the frequency of relative movement between the textile material and the measuring member.

9. Apparatus as in claim 7 in which a rectifier is provided to receive the output signal from said filter.

10. Apparatus as in claim 9 in which: an amplifier is coupled to said rectifier to amplify the rectified signal; and a transducer is connected to said amplifier to receive the amplified signal and convert it to an evaluable signal.

11. Apparatus as in claim 9 in which said rectifier is a full wave rectifier.

12. Apparatus as in claim 11 in which: an amplifier is coupled to said rectifier to amplify the rectified signal; and a transducer is connected to said amplifier to receive the amplified signal and convert it to an evaluable signal.

13. Apparatus as in claim 12 in which said filter comprises: a transformer; and an electrical condenser connected in series.

14. Apparatus as in claim 12 in which said filter comprises: a condenser; and a resistor connected in series therewith.

15. Apparatus as in claim 12 in which said measuring member comprises: a plate condenser as a sensing element.

References Cited by the Examiner

UNITED STATES PATENTS

| 2,200,863 | 5/40 | Schuck | 324—61 X |
| 2,583,546 | 1/52 | Carlson | 324—61 X |
| 2,800,591 | 7/57 | Gilman | 250—83.4 |
| 2,919,624 | 1/60 | Lindermann et al. | 250—244 X |

FOREIGN PATENTS 216,854  9/58  Australia.

WALTER L. CARLSON, *Primary Examiner.*

SAMUEL BERNSTEIN, *Examiner.*